United States Patent [19]

Scheve et al.

[11] Patent Number: 4,916,198

[45] Date of Patent: Apr. 10, 1990

[54] HIGH MELT STRENGTH, PROPYLENE POLYMER, PROCESS FOR MAKING IT, AND USE THEREOF

[75] Inventors: B. Joseph Scheve; John W. Mayfield; Anthony J. DeNicola, Jr., all of New Castle County, Del.

[73] Assignee: HIMONT Incorporated, Wilmington, Del.

[21] Appl. No.: 152,619

[22] Filed: Feb. 5, 1988

Related U.S. Application Data

[63] Continuation-in-part of Ser. No. 819,395, Jan. 16, 1986, abandoned, which is a continuation-in-part of Ser. No. 696,799, Jan. 31, 1985, abandoned.

[51] Int. Cl.$^4$ .......................................... C08F 110/06
[52] U.S. Cl. ..................................... 526/351; 522/129
[58] Field of Search ........................ 526/351; 522/129

[56] References Cited

U.S. PATENT DOCUMENTS

| | | |
|---|---|---|
| 2,525,787 | 10/1950 | Fontana et al. |
| 3,349,018 | 10/1967 | Potts . |
| 3,758,273 | 9/1973 | Johnston et al. |
| 4,283,076 | 8/1981 | Boynton .............................. 525/240 |
| 4,363,901 | 12/1982 | Kikuta et al. ........................ 526/351 |
| 4,384,098 | 5/1983 | Hagler et al. ........................ 526/351 |
| 4,401,799 | 8/1983 | Ueno et al. .......................... 526/351 |
| 4,522,994 | 6/1985 | Chiba et al. ......................... 526/351 |

OTHER PUBLICATIONS

C. M. Fontana et al, Catalyzed Polymerization of Monoalkylethylenes, Ind. Eng. Chem., 44m 1688–1695, (1952).

R. W. Kilb, The Effect of Simultaneous Crosslinking and Degradation On the Intrinsic Viscosity of a Polymer, J. Poly. Ch. 63, 1838–1843, (1959).

R. M. Black et al., Radiation–Induced Changes in the Structure of Polypropylene, Proc. Roy. Soc. (London), A253, 322–330, (1959).

H. Sobue et al., Heat Treatment of Irradiated Polypropylene, Nature, 188, 315–316 (1960).

Onishi et al., Electron Spin Resonance Studies of Irradiated Polymers I. Factors Affecting the Electron Spin Resonance Spectra of Irradiated Polymers, Polymer, 2, 119–141, (1961).

R. P. Gupta, Proton Magnetic Resonance of Neutron Irradiated Polypropylene, Kolloid Z., 174, 74–75, (1961).

Sauer et al., Dynamic Mechanical Studies of Irradiated Polypropylene, J. Poly. Sci., 58, 1928, (1962).

W. Schnabel et al., Radiation Chemistry of Isotactic and Atactic Polypropylene I. Gas Evolution and Gel Studies, J. Poly. Ch., 67, 295–299, (1963).

R. W. Keyser et al., Radiation Chemistry of Isotactic and Atactic Polypropylene. II, Intrinsic Viscosity Studies, J. Poly. Chem., 67 300–303, (1963).

R. Solovey et al., Irradition of Polyethylene Oxide and Polypropylene, J. Poly. Sci., Part A, 1, 2155–2162, (1963).

R. A. Veselovshii et al., Thermal Degradation of Irradiated Polypropylene, Poly. Sci., USSR, 8, 817–823, (1966).

D. O. Geymer, The Effects of Ionizing Radiation on the Molecular Weight of Crystalline Polypropylene, Die Makromol. Chem., 199, 152–159 (1966).

(List continued on next page.)

*Primary Examiner*—Jacob Ziegler

[57] ABSTRACT

Disclosed is a normally solid, high molecular weight, gel-free, amorphous to predominantly crystalline, propylene polymer characterized by high melt strength due to strain hardening which is believed to be caused by free-end long chain branches of the molecular chains forming the polymer.

Also disclosed is a process for making the polymer by high energy radiation of a normally solid, high molecular weight, linear, propylene polymer in a reduced active oxygen environment, maintaining the irradiated material in such environment for a specific period of time, and then deactivating free radicals in the material.

Further disclosed is the use of the strain hardening polymer in extensional flow operations such as, for example, extrusion coating, film production, and thermoforming.

9 Claims, 3 Drawing Sheets

OTHER PUBLICATIONS

N. S. Marans et al., Molecular Weight Changes in Irradiated Polypropylene, J. Appl. Pol. Sci., 11, 705–718 (1967).

D. O. Geymer, The Mechanism of the Radiation-Induced Crosslinking of Polyolefins, Die Makromol. Chm., 100, 186–199 (1967).

R. A. Veselovskii et al., Some Problems of the Radiation Chemistry of Polypropylene, Poly. Sci., (USSR), 10, 881–894, (1968).

G. Odian et al., Radiation Effects in Polypropylene and Ethylene-Propylene Copolymers, J. Pol. Sci., 16, 3619–3623, (1967).

T. Ooi et al., E.s.r. study of γ-irradiated isotactic and atactic polypropylene, Polymer, 16, 510–514 (1975).

M. Dole, The Radiation Chemistry of Macromolecules, vol. 11, Radiation Chemistry of Substituted Vinyl Polymers, Chapter 1, Polypropylene (D. O. Geymer) 3–28, Academic Press, 1973.

V. A. Radtzig, EPR Spectra, Free Radical Structure and Conformations in Polypropylene and Polybut-1-ene, Poly. Sci., (USSR), 17, 179–190 (1975).

F. Szocs et al., Pressure Dependence of Free Radical Decay in Irradiated Isotactic Polypropylene, Eur. Poly. J., 11, 559–560 (1975).

V. Markovic et al., Crosslinking Effects on Flow of Irradiated Polyolefins, Modern Plastics, October 1979, 53, 58 and 60.

W. K. Busfield et al., Effects of Gamma Radiation on the Mechanical Properties and Crystallinity of Polypropylene Film, Eur. Poly. J., 15, 379–387 (1979).

T. S. Dunn et al., Radical Structure and Its Role in the Oxidative Degradation of γ-Irradiated Polyproylene, Radiat. Phys. Chem., 14, 625–634.

C. S. Wang et al., Effects of Radiation on the Structure of Polypropylene, Pol. J. 13, 741–747 (1981).

N. Gvozdic et al., Kinetics of Free Radical Decay Reactions in Irradiated Polypropylene, J. Phys. Chem., 85, 1563–1569 (1981).

EL-S.A. Hegazy et al., Radiation-Induced Oxidative Degradation of Isotactic Polypropylene, J. Appl. Polym. Sci., 26, 1361–1362, Apr. 1981.

T. S. Dunn et al., The Dependence of Radical Termination Rates on Percent Crystallinity in Gamma Irradiated Isotactic Polypropylene, Radiat. Phys. Chem. 19, 287–290 (1982).

J. L. Williams et al., Mobility as a Mechanism for Radiation Stabilization of Polypropylene, Radiat. Phys. Chem., 19, 291–296 (1982).

R. P. Braginsky et al., Stqabiliation of Radiation Modified Polyolefins, Moscow, Khymiva, 80–88 (1973).

D. V. Ivanjukov et al., Polypropylene (Properties and Use), Moscow, Khymiya, 184–185 (1974).

HIGH MELT STRENGTH, PROPYLENE POLYMER, PROCESS FOR MAKING IT, AND USE THEREOF

FIELD OF INVENTION

This invention resides in the chemical arts. More particularly, it relates to the chemical art having to do with synthetic resins derived from alpha or 1-olefins. Specifically, it relates to synthetic resins formed by the polymerization of propylene alone or with other olefins.

BACKGROUND OF THE INVENTION

The synthetic resin formed by the polymerization of propylene as the sole monomer is called polypropylene. While "polypropylene" has been used from time to time in the art to include a copolymer of propylene and a minor amount of another monomer, such as ethylene, the term is not so used herein.

The well-known crystalline polypropylene of commerce is a normally solid, predominantly isotactic, semi-crystalline, thermoplastic polymer mixture formed by the polymerization of propylene by Ziegler-Natta catalysis. In such catalysis the catalyst is formed by an inorganic compound of a metal of Groups I–III of the Perodic Table, (for example, an aluminum alkyl), and a compound of a transition metal of Groups IV–VIII of the Periodic Table, (for example, a titanium halide). A typical crystallinity is about 60% as measured by X-ray diffraction. As used herein, semi-crystalline means a crystallinity of at least about 5–10% as measured by X-ray diffraction. Also, the typical weight average molecular weight (Mw) of the normally solid polypropylene of commerce is 100,000–4,000,000, while the typical number average molecular weight (Mn) thereof is 40,000–100,000. Moreover, the melting point of the normally solid polypropylene of commerce is about 162° C.

Although the polypropylene of commerce has many desirable and beneficial properties, it is deficient in melt strength. When molten, it exhibits no strain hardening (an increase in resistance to stretching during elongation of the molten material). Thus it has a variety of melt processing shortcomings, including the onset of edge weave during high speed extrusion coating of paper or other substrates, sheet sag and local thinning in melt thermoforming, and flow instabilities in coextrusion of laminate structures. As a result, its use has been limited in such potential applications as, for example, extrusion coating, blow molding, profile extrusion, and thermoforming.

On the other hand, low density polyethylene made by a free radical process has desirable melt rheology for applications that require melt strength or strain hardening properties. Such low density polyethylene is believed to have these properties because the polymer molecules are non-linear. The molecules are chains of ethylene units that have branches of ethylene units. This non-linear structure occurs because of typical free radical inter- and intra-molecular transfer followed by further subsequent polymerization.

Low molecular weight, amorphous (predominantly atactic) polypropylene with a branched molecular structure is known in the prior art. See Fontana, Kidder and Herold, Ind. & Eng. Chem., 44 (7), 1688–1695 (1952), and the U.S. Pat. No. 2,525,787, to Fontana et al. It is disclosed as having been made by Friedel-Crafts catalysis. However, the molecular weight (weight average) of this polypropylene is at most about 20,000, the polymer is described as having normal (at 20° C.) viscosity ranging from that of a light lubricating oil to that of a heavy oil or even resins of plastic or semi-solid nature, and its utility is reported to be as a blending agent and viscosity index improver for lubricating oils.

The crystalline polypropylene of commerce, however, is linear. That is, the polymer molecules are chains of propylene units without branches of propylene units. The reason is that in Ziegler-Natta catalysis secondary free radical reactions such as occur in the free radical polymerization of ethylene are highly improbable, if not non-existent.

Some effort has been made in the art to overcome the melt strength deficiency of the crystalline polypropylene of commerce.

Thus, as reflected in the U.S. Pat. No. 4,365,044, to Liu, and cited references thereof, blending of linear polypropylene with a low density polyethylene that does have desirable melt strength or strain hardening properties, alone or with other polymeric substances, has been tried with some success. However, the blend approach involving different polymeric substances is not preferred.

Another approach to improve the melt properties of linear polypropylene is disclosed in the U.S. Pat. No. 3,349,018, to Potts. According to this patent, linear polypropylene is degraded by subjecting it in air to ionizing radiation at a total dose from about 0.01 to about 3 megareps (equivalent to about 0.012 to about 3.6 megarads), but less than a dose at which gelation is caused. This patent discloses that radiation degraded linear polypropylene can be extruded and drawn at much higher linear speeds without the occurrence of draw resonance or surging. However, as can be determined from the patent, particularly Example VI, the neck-in of the in-air irradiated linear polypropylene is actually greater than the neck-in of the non-irradiated linear polypropylene.

There are a number of references that disclose the ionizing radiation treatment of linear crystalline polypropylene. These references, however, describe the resulting polymer either as degraded, as a result of chain scisson, or as cross-linked, as a result of polymer chain fragments linking together linear polymer chains. There seems to be very little true recognition, if any, in these references of the possibility of an intermediate condition in which the product of the treatment is a polypropylene having "dangling" or free-end long branches.

For example, one such reference is Marans and Zapas, J. Appl. Pol. Sci., 11, 705–718 (1967). This reference reports experiments in which samples of a powdered, crystalline, linear polypropylene in sealed glass tubes are subjected at pressures less than 0.3 millimeters of mercury to electron radiation at various doses of radiation, and then heated to 175° C. to melt the irradiated polypropylene. The authors of this reference characterize the irradiated polypropylene of the samples as cross-linked. However, in connection with the instant invention, duplicative experiments and more advanced measuring techniques have indicated that Marans and Zapas had in fact obtained polypropylene with free-end long branches. On the other hand, the reference contains no disclosures of utility of the irradiated and heat treated samples.

Geymer, Die Makromolekulare Chemie, 99, 152–159, (1969 No. 2230), discloses experiments in which a crystalline, linear, polypropylene was subjected in a vacuum to gamma ray radiation from cobalt 60, and afterwards exposed to methyl mercaptan (to minimize oxidative degradation on exposure of the irradiated polymer to air), and then exposed to air. While the reference states that the simultaneous fracture and cross-linking result in branched molecules, no utility of the resulting propylene polymer material is disclosed. Moreover, while the reference does not disclose the dose rate of the gamma radiation, the usual dose rate from the usual cobalt 60 source is of the magnitude of about 1 Mrad. per hour. In view of work done in connection with the instant invention, the extent of branching without cross-linking in the Geymer experiments, therefore, is believed to have been insignificant.

SUMMARY OF THE INVENTION

This invention in one aspect comprises a normally solid, high molecular weight, gel-free, predominantly isotactic, semi-crystalline polypropylene, the molecular chains of which have a substantial amount of free-end long branches. More particularily, it comprises a normally solid, high molecular weight, gel-free, predominantly isotactic, semi-crystalline, polypropylene, the branching index of which is less than 1, and that has significant strain hardening elongational viscosity.

More broadly this invention comprises a normally solid, high molecular weight, gel-free, propylene polymer material, the branching index of which is less than 1, and that has significant strain hardening elongational viscosity.

As used herein, "propylene polymer material" means propylene polymer material selected from the group consisting of (a) homopolymers of propylene, (b) random copolymers of propylene and an olefin selected from the group consisting of ethylene, $C_4$–$C_{10}$ 1-olefins, and $C_4$–$C_{10}$ dienes, provided that, when said olefin is ethylene, the maximum polymerized ethylene content is about 5 (preferably about 4) % by weight, when said olefin is a $C_4$–$C_{10}$ 1-olefin, the maximum polymerized content thereof is about 20 (preferably about 16) % by weight, and when said olefin is a $C_4$–$C_{10}$ diene, the maximum polymerized content thereof is about 5 (preferably about 4) % by weight, and (c) random terpolymers of propylene and 1-olefins selected from the group consisting of ethylene and $C_4$–$C_8$ 1-olefins, provided that the maximum polymerized $C_4$–$C_8$ 1-olefin content is about 20 (preferably about 16) % by weight, and when ethylene is one of said 1-olefins, the maximum polymerized ethylene content is about 5 (preferably about 4) % by weight. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, 2,3-dimethyl-1,3-hexadiene, and the like.

Also, as used herein, "high molecular weight" means weight average molecular weight of at least about 100,000.

The branching index quantifies the degree of long chain branching. In preferred embodiments the branching index is preferably less than about 0.9 and most preferably about 0.2–0.4. It is defined by the equation:

$$g' = \frac{[IV]_{Br}}{[IV]_{Lin}} \bigg|_{M_w}$$

in which g' is the branching index, $[IV]_{Br}$ is the intrinsic viscosity of the branched propylene polymer material and $[IV]_{Lin}$ is the intrisic viscosity of the corresponding, linear, propylene polymer material, namely, normally solid, linear, propylene polymer material of substantially the same weight average molecular weight and, in the case of copolymers and terpolymers, substantially the same relative molecular proportion or proportions of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule. Hence, in comparing a nonlinear polymer with a linear polymer of substantially the same weight average molecular weight, it is an indication of configuration of the nonlinear polymer molecule. Indeed, the above ratio of intrinsic viscosities is a measure of the degree of branching of the nonlinear polymer. A method for determing intrinsic viscosity of propylene polymer material is described by Elliott et al., J. App. Poly. Sci., 14, pp 2947–2963 (1970). In this specification the intrinsic viscosity in each instance is determined with the polymer dissolved in decahydronaphthalene at 135° C.

Weight average molecular weight can be measured by various procedures. However, the procedure preferably used here is that of low angle laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semifluid substance to elongation. It is a melt property of a thermoplastic material, that can be determined by an instrument that measures the stress and strain of a specimen in the melt state when subjected to tensile strain at a constant rate. One such instrument is described in, and shown in FIG. 1 of, Munstedt, J. Rheology, 23, (4), 421–425, (1979). A commercial instrument of similar design is the Rheometrics RER-9000 extensional rheometer. Molten, high molecular weight, linear, propylene polymer material exhibits elongational viscosity which, as it is elongated or drawn at a constant rate from a relatively fixed point, tends to increase for a distance dependent on the rate of elongation, and then to decrease rapidly until it thins to nothing—so-called ductile or necking failure. On the other hand, the molten propylene polymer material of this invention, that is of substantially the same weight average molecular weight and at substantially the same test temperature as the corresponding, molten, high molecular weight, linear, propylene polymer material, exhibits elongational viscosity which, as it is elongated or drawn from a relatively fixed point at substantially the same rate of elongation tends to increase over a longer distance, and it breaks or fails by fracture—so-called brittle or elastic failure. These characteristics are indicative of strain hardening. Indeed, the more long chain branching the propylene polymer material of this invention has the greater the tendency of the elongational viscosity to increase as the elongated material approaches failure.

This latter tendency is most evident when the branching index is less than about 0.8.

This invention in another aspect provides a practical process for converting normally solid, high molecular weight, linear, propylene polymer material into normally solid, high molecular weight, gel-free, propylene polymer material, the branching index of which is less than 1, and that has significant strain hardening elongational viscosity.

The process comprises:

(1) irradiating said linear, propylene polymer material (a) in an environment in which the active oxygen concentration is established and maintained at less than about 15% by volume of said environment (b) with high energy ionizing radiation at a dose rate in the range from about 1 to about $1 \times 10^4$ megarads per minute for a period of time sufficient for a substantial amount of chain scisson of the linear, propylene polymer material to occur, but insufficient to cause gelation of the material;

(2) maintaining the thus irradiated material in such an environment for a period of time sufficient for a significant amount of long chain branches to form; and (3) then treating the irradiated material while in such an environment to deactivate substantially all the free radicals present in the irradiated material.

The linear, propylene polymer material treated according to the process of this invention can be any normally solid, high molecular weight linear, propylene polymer material. However, because the irradiation results in chain scisson, even though there is recombination of chain fragments to reform chains, as well as joining of chain fragments to chains to form branches, there can be a net reduction in weight average molecular weight between the starting material and the end product, the desired substantially branched, high molecular weight, propylene polymer material. In general, the intrinsic viscosity of the starting, linear, propylene polymer material, which is indicative of its molecular weight, should be in general about 1-25 dl/gm, and preferably 2-6 dl/gm, to result in an end product with an intrinsic viscosity of 0.8-25 dl/gm and preferably 1-3 dl/gm. However, linear, propylene polymer material with intrinsic viscosities higher and lower than these general values are within the broader scope of this invention.

Results obtained in recent investigations have indicated that in the normally solid, high molecular weight, predominantly isotactic, semi-crystalline, linear polypropylene treated according to the process of this invention, the long chain free end branching is confined for the most part to the amorphous fraction of the semi-crystalline polypropylene. This fraction comprises normally solid, atactic polypropylene as well as normally solid, crystallizable, but not crystallized, stereoregular polypropylene. Hence, the linear, propylene polymer material treated according to the process of this invention in its broader aspects can be normally solid, high molecular weight, amorphous, linear, propylene polymer material with little or no crystalline propylene polymer content. Indeed, it can be normally solid, high molecular weight, amorphous, linear, propylene polymer material with little or no crystallizable propylene polymer content, i.e., atactic polypropylene, or normally solid, high molecular weight, linear, amorphous, propylene polymer material with little or no atactic propylene polymer content, i.e., crystallizable, but not crystallized, stereoregular, propylene polymer. Furthermore, this invention in its broader aspects comprises the propylene polymer product resulting from the treatment of normally solid, high molecular weight, linear, amorphous, propylene polymer material by said process.

The high molecular weight, linear, propylene polymer material treated according to the process of this invention under the broadest concepts of the process can be in any physical form, for example, finely divided particles, granules, pellets, film, sheet, and the like. However, in preferred embodiments of the process of this invention, the linear, propylene polymer material is in a finely divided condition with satisfactory results being obtained at an average particle size of about 60 mesh US screen size. In these embodiments it is a powder which commercially is referred to as flake.

The active oxygen content of the environment in which the three process steps are carried out is a critical factor. The expression "active oxygen" herein means oxygen in a form that will react with the irradiated material and more particularly the free radicals in the material. It includes molecular oxygen (which is the form of oxygen normally found in air). The active oxygen content requirement of the process of this invention can be achieved by use of vacuum or by replacing part or all of air in the environment by an inert gas such as, for example, nitrogen.

Linear, propylene polymer material immediately after it is made is normally substantially free of active oxygen. Therefore, it is within the concepts of this invention to follow the polymerization and polymer work-up steps (when the propylene polymer material is not exposed to air) with the process of this invention. However, in most situations the linear, propylene polymer material will have an active oxygen content because of having been stored in air, or for some other reason. Consequently, in the preferred practice of the process of this invention the finely divided, linear, propylene polymer material is first treated to reduce its active oxygen content. A preferred way of doing this is to introduce the material into a bed of the same blown with nitrogen, the active oxygen content of which is equal to or less than about 0.004% by volume. The residence time of the material in the bed generally should be at least about 5 minutes for effective removal of active oxygen from the interstices of the particles of the material, and preferably long enough for the material to be in equilibrium with the environment.

Between this preparation step and the irradiation step, the prepared, linear, propylene polymer material should be maintained in an environment in which the active oxygen concentration is less than about 15%, preferably less than 5% in a gas conveyance system, and more preferably 0.004%, by volume of the environment. In addition, temperature of the linear, propylene polymer material should be kept above the glass transition temperature of the amorphous fraction of the material, if any is present, and because it usually is, generally at less than about 40° C. and preferably at about 25° C., because of the increase in temperature of the material that occurs in the irradiation step.

In the irradiation step the active oxygen concentration of the environment preferably is less than about 5% by volume, and more preferably less than about 1% by volume. The most preferred concentration of active oxygen is 0.004% by volume.

In the irradiation step, the ionizing radiation should have sufficient energy to penetrate to the extent desired the mass of linear, propylene polymer material being radiated. The energy must be sufficient to ionize the molecular structure and to excite atomic structure, but not sufficient to affect atomic nuclei. The ionizing radiation can be of any kind, but the most practical kinds comprise electrons and gamma rays. Preferred are electrons beamed from an electron generator having an accelerating potential of 500-4,000 kilovolts. In the case of propylene polymer material without a polymerized diene content, satisfactory results are obtained at a dose of ionizing radiation of about 1-9 megarads, preferably 3-8 megarads, delivered generally at a dose rate of about 1-10,000 megarads per minute, and preferably about 18-2,000 megarads per minute. In the case of propylene polymer material having a polymerized diene content, satisfactory results are obtained with a dose of about 0.25 megarad-about 1.5 megarads, preferably about 0.5 megarad-1.5 megarads, delivered at the foregoing dose rates.

The term "rad" is usually defined as that quantity of ionizing radiation that results in the absorption of 100 ergs of energy per gram of irradiated material, regardless of the source of radiation. As far as the instant invention is concerned, the amount of energy absorbed by the linear, propylene polymer material when it is irradiated usually is not determined. However, in the usual practice of the process energy absorption from ionizing radiation is measured by the well known conventional dosimeter, a measuring device in which a strip of fabric containing a radiation sensitive dye is the energy absorption sensing means. Hence, as used in this specification the term "rad" means that quantity of ionizing radiation resulting in the absorption of the equivalent of 100 ergs of energy per gram of the fabric of a dosimeter placed at the surface of the linear, propylene polymer material being irradiated, whether in the form of a bed or layer of particles, or a film, or a sheet.

The second step of the process of this invention should be performed in a period of time generally in the range from about one minute to about one hour, and preferably about 2-30 minutes. A minimum time is needed for sufficient migration of propylene polymer chain fragments to free radical sites and for combination thereat to reform complete chains, or to form long branches on chains. A radical migration time less than one minute, for example, about a half minute, is within the broader concepts of this invention, but is not preferred because the amount of resulting free-end long chain branching is quite low.

The final step of the process, the free radical deactivation or quenching step, can be performed by the application of heat or by the addition of an additive that functions as a free radical trap, such as, for example, methyl mercaptan.

In one embodiment of the process the application of heat comprises extruding the irradiated propylene polymer material at about 200° C. At this temperature the irradiated propylene polymer material is melted. As a result, quenching of the free radicals is substantially complete. In this embodiment, prior to the extrusion or melt compounding, the irradiated propylene polymer material can be blended with other polymers, for example, linear, propylene polymer material, if desired, and additives such as, for example, stabilizers, pigments, fillers, and the like. Alternatively, such additives can be incorporated as a side stream addition to the extruder.

In another embodiment of the inventive process the application of heat is achieved by introducing the irradiated propylene polymer material into a fluidized bed or a staged fluid bed system in which the fluidizing medium is, for example, nitrogen or other inert gas. The bed or beds is or are established and maintained in a temperature range of at least about 60° C. up to about 160° C. and preferably 80°-140° C., with the average residence time of the irradiated propylene polymer material in the fluid bed or beds being from about 5 minutes to about 120 minutes, with about 20-30 minutes being optimum.

The product thus obtained is a normally solid, high molecular weight, gel-free, propylene polymer material characterized by strain hardening.

Although the process of the invention can be carried out on a batch basis, preferably it is performed on a continuous basis. In one continuous embodiment of the process the finely divided, linear, propylene polymer material either with or without the preparation step, depending on the active oxygen content of the material, is layered on a traveling belt in the required environment. The thickness of the layer depends on the desired extent of penetration of the ionizing radiation into the layer and the proportion of linear, propylene polymer material desired in the final end product. The speed of travel of the traveling belt is selected so that the layer of finely divided, propylene polymer material passes through the beam or beams of ionizing radiation at a rate to receive the desired dose of ionizing radiation. After having received the desired dose of ionizing radiation, the irradiated layer can be left on the traveling belt in said environment for the period of time for free-radical migration and combination to occur, and then removed from the belt, and introduced into an extruder operated at a melt temperature of the irradiated material, or, in another specific embodiment introduced into a heated bed, or a staged system of heated beds, of particles of irradiated material fluidized with nitrogen or other inert gas. In either embodiment, the irradiated material after at least substantially all of the free radicals therein are deactivated is discharged into the atmosphere and quickly cooled to room temperature. In another embodiment, the irradiated, propylene polymer material is discharged from the belt and conveyed in the required environment to a holding vessel, the interior of which has the required environment, and held in the vessel to complete the requisite free radical migration time. The irradiated material then is introduced into an extruder operated at a melt temperature of the irradiated material or is introduced into a heated, inert gas fluidized bed, or a staged system of fluidized beds, of irradiated particles of propylene polymer material and, after quenching of the free radicals, the irradiated polypropylene is discharged into the atmosphere.

This invention is still another aspect comprises the extensional flow use of the strain hardening, propylene polymer material of this invention. Extensional flow occurs when the propylene polymer material in the molten condition is pulled in one or more directions at a rate faster than it would normally flow in those directions. It happens in extrusion coating operations in which a melted coating material is extruded on to a substrate such as a moving web of paper or metal sheet, and the extruder or substrate is moving at a higher rate than the extrusion rate. It takes place in film production when the molten film is extruded and then stretched to the desired thinness. It is present in thermoforming operations in which a molten sheet is clamped over a plug mold, vacuum is applied and the sheet is pushed into the mold. It occurs in the manufacture of foamed articles in which molten propylene polymer material is expanded with a foaming agent. The strain hardening propylene polymer material of this invention is particularly useful as part of (for example from as little as 0.5% by weight to as much as 95% or more by weight) or, particularly in the case of strain hardening, predominantly isotactic, semi-crystalline propylene polymer material, as substantially all of the molten plastic material used in these and other melt processing methods (for example, profile extrusion, as in the melt spinning of fibers) for making useful articles. In the case of the strain hardening, amorphous, propylene polymer material of this invention, it is particularly useful when blended with normally solid, predominantly isotactic, semi-crystalline, linear, propylene polymer material for use in melt processing and other operations for making useful articles.

This invention is further illustrated by the accompanying drawings which form a material part of these disclosures, and by the following examples.

DESCRIPTION OF PREFERRED EMBODIMENTS

Figure 1:
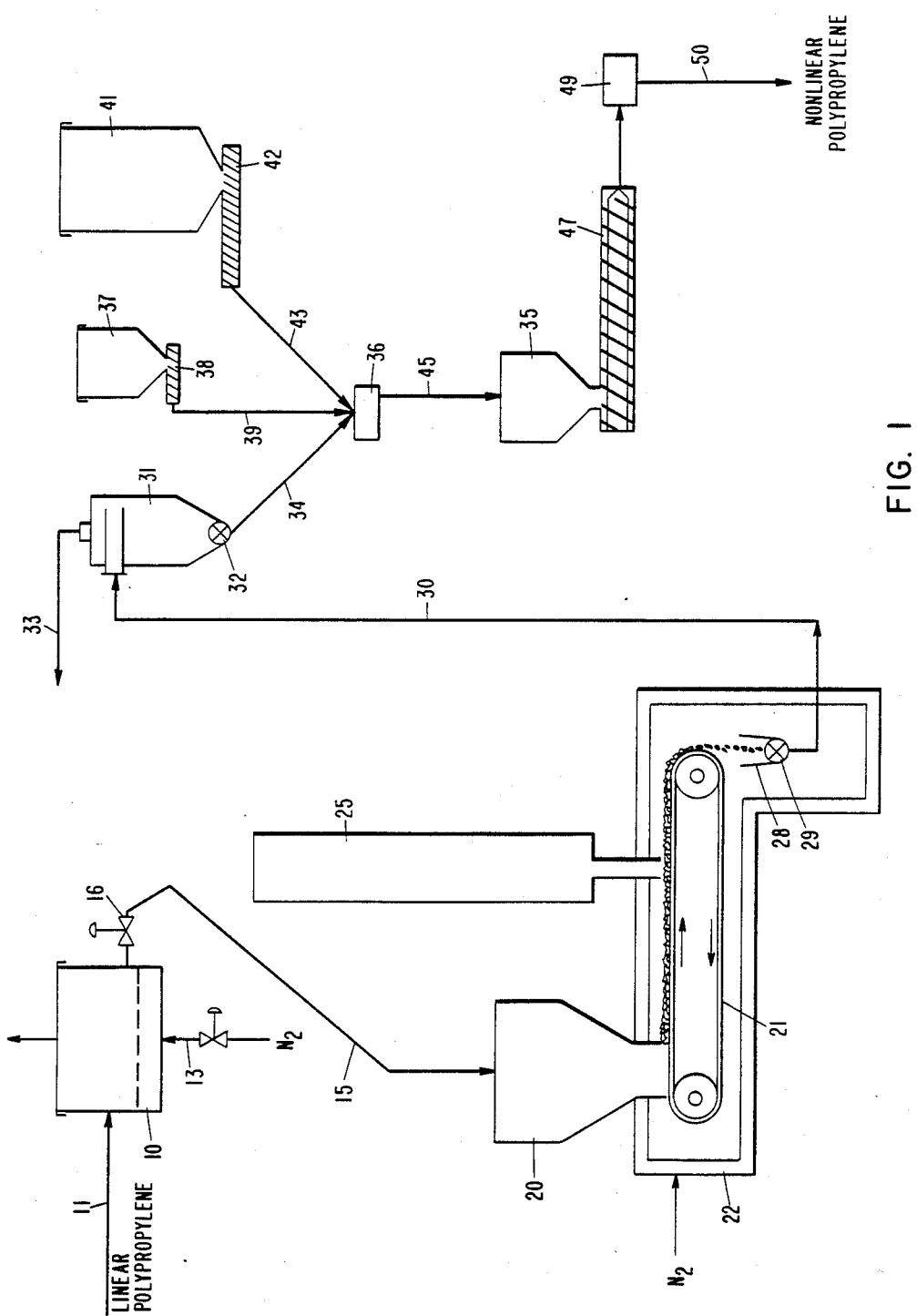
FIG. 1 is a schematic flow sheet of a preferred embodiment of a continuous process for converting, for example, normally solid, predominantly isotactic, semi-crystalline, linear polypropylene into a normally solid, gel-free, predominantly isotactic, semi-crystalline polypropylene with strain hardening.

In greater detail, FIG. 1 depicts a fluid bed unit 10 of conventional construction and operation into which finely divided, high molecular weight, linear polypropylene is introduced by way of conduit 11, nitrogen gas is introduced by way of conduit 13, and from which substantially active oxygen free, high molecular weight, linear polypropylene is removed by way of a solids discharge conduit 15 which also has a solids flow rate controller 16. The solids discharge conduit 15 leads to a conveyer belt feed hopper 20.

The conveyer belt feed hopper 20 is a capped structure of conventional design. It is operated so that its interior contains a nitrogen atmosphere. It has a bottom solids discharge outlet through which the linear polypropylene particles move and form a layer on the top horizontal run of an endless conveyer belt 21.

The conveyer belt 21 is generally horizontally disposed, and continuously moves under normal operative conditions. It is contained in radiation chamber 22. This chamber completely encloses the conveyer belt, and is constructed and operated to establish and maintain a nitrogen atmosphere in its interior.

In combination with the radiation chamber 22 is an electron beam generator 25 of conventional design and operation. Under normal operative conditions it generates a beam of high energy electrons directed to the layer of linear polypropylene particles on the conveyer belt 21. Below the discharge end of the conveyer belt is a solids collector 28 arranged to receive the irradiated polypropylene particles falling off the conveyer belt 21 as it turns into its path of opposite travel. Irradiated polypropylene particles in the solids collector 28 are removed therefrom by a rotary valve or star wheel 29 and delivered thereby to a solids transfer line 30.

The transfer line 30 leads to a gas-solids separator 31. This unit is of conventional construction and usually is a cyclone type separator. Gas separated therein is removed as by gas discharge conduit 33 while separated solids are discharged therefrom as by a rotary valve or star wheel 32 into a solids discharge line 34. The solids discharge line 34 can lead directly to an extruder hopper 35. However, in the embodiment shown, it leads to a plow blender 36.

In the embodiment shown, there is provided a hopper 37 for such additives as stabilizers or an additive concentrate consisting essentially of finely divided linear polypropylene (or even the polypropylene or other high melt strength, propylene polymer material of this invention) and additives at greater concentrations than in the final product. The additive hopper 37 preferably is conventional, and preferably is constructed and operated to maintain the contents in a nitrogen atmosphere. The discharge end of the additives hopper 37 empties into a screw feeder 38 which feeds material into an additives transfer line 39 that goes to the plow blender 36. In addition, in the embodiment shown, there is provided a bulk feed hopper 41 in which, for example, finely divided or pelletized linear polypropylene is contained. This hopper is conventional, and it too preferably is constructed and operated to maintain the contents in a nitrogen atmosphere. The bulk feed hopper 41 empties into a screw feeder 42 which feeds a solids transfer line 43 that goes to the plow blender 36. In the plow blender 36, the solids fed into it are blended and then discharged into a blended feed line 45 that empties into the extruder hopper 35.

The extruder hopper 35, which feeds an extruder 47, is conventional in construction and operation. It too is an enclosed structure adapted for establishing and maintaining a nitrogen atmosphere in its interior. The extruder 47 is of conventional construction, and is operated in normal fashion. The solids in the extruder hopper 35 move therefrom into the extruder which is operated at a rate of extrusion to result in the period of time between irradiation of the polypropylene and its entry into the extruder being sufficient for a significant amount of free-end long chain branches to form. Accordingly, the volume of the extruder hopper 35 is selected to provide, if necessary, the desired amount of hopper storage time to meet this condition. The extruder 47 is designed (length of extruder barrel and screw) and operated at a melt temperature and at a pressure sufficient to maintain the free radical containing polypropylene therein for the amount of time needed to deactivate substantially all of the free radicals present.

The thus treated, finely divided polypropylene is characterized by being substantially gel-free, predominantly isotactic, semi-crystalline, and substantially branched with free-end long chains of propylene units. It can be used as is, or introduced, for example, directly into a pelletizing and cooling unit 49 and conveyed away therefrom as by solids transport line 50 as solid pellets which can be stored and then used, or used without storage.

Similar results are achieved when other specific embodiments of linear, high molecular weight, propylene polymer material are treated according to the continuous process just depicted.

EXAMPLES 1 AND 2

These examples illustrate the nonlinear, high molecular weight, polypropylene of this invention, and the foregoing preferred embodiment of a process for making it.

In these examples a finely divided (flake) polypropylene of commerce, having a conventional phenolic antioxidant content of about 0.001% by weight, and characterized by a nominal melt flow rate (dg/min., ASTM Method D 1238, Condition L) of 0.2 and density (g/cm$^3$, ASTM method D 792A-2) of 0.902, is introduced into the fluid bed unit 10 and fluidized with nitrogen for 60 minutes.

The thus treated polypropylene powder is then dropped into the conveyer belt feed hopper 20 which lays it on the moving 200 mesh stainless steel conveyer belt 21 to form a bed of polypropylene powder 1.5 cm high and 30.5 cm wide. The bed is passed by the conveyer belt 21 through an electron beam generated by a 2 MeV Van de Graff generator operating at a 250 amp beam current with a scanned beam width of 40.6 cm at the top surface of the conveyer belt 21. The conveyor belt speeds and resulting absorbed surface doses in these examples are set forth in the following Table I. In addition, the active oxygen content of the environment or atmosphere within the enclosed radiation chamber 22 and in the remaining part of the system comprising the irradiated polypropylene transfer line 30, the solids-gas separator 31, the separator discharge line 34, the blender 36, the blender discharge line 45 and the extruder hopper 35, is established and maintained in each example as indicated also in Table I.

After irradiation, the polypropylene falls off the end of the conveyer belt 21 into the belt discharge collector 28 and through the rotary valve 29 into the transfer line 30. After separation of gas from the irradiated polymer, the polymer is fed through the separator discharge line 34 into the blender 36. In these examples, a finely divided additive concentrate, consisting essentially of a linear polypropylene (100 parts by weight), conventional phenolic antioxidant (10.1 parts by weight), and calcium stearate (7.0 parts by weight), from the additive hopper 37 is added by way of the additives transfer line 39 to the blender 36 at a rate of 3 parts by weight per 100 parts by weight of the irradiated polymer. The resulting blend is then fed by way of blender discharge line 45 from the blender 36 into the extruder feed hopper 35.

The extruder 47 is a 6.4 cm barrel diameter single screw Sterling extruder operated at a 245° C. set temperature to give a 235° C. melt temperature. The pelletizing (valved) die of the pelletizing and cooling unit 49 is adjusted to give a pressure of 70 kg/cm$^2$. The extruder throughput in each example is regulated to match the throughput of linear polypropylene under the electron beam, and there is no irradiated polymer level maintained in the extruder feed hopper 35. In other words, the extruder 47 in each example is "starve-fed". The extruder strands of product from the die are cooled in water and then cold sliced to form pellets.

Properties of the end products of Examples 1 and 2 and those of a control, a visbroken, linear, crystalline polypropylene of commerce, are summarized in the following Table I.

TABLE I

| Material | Belt Speed cm/min | Hold Time Min. | MFR[a] dg/min | IV[b] dl/gm | $\eta_o$[c] 10$^4$ poise | Mw[d] gm/mole | g[f] | ΔE[g] kcal/mole |
|---|---|---|---|---|---|---|---|---|
| Control: Visbroken Linear Polypropylene | — | — | 4.1 | 2.36 | 8 | 298,000[e] | — | 13.3 |
| Example 1 Product (1 Mrad, 0.2% by vol. O$_2$ in N$_2$) | 45.7 | 0.6 | 3.0 | 2.21 | 10 | 343,000 | 0.98 | — |
| Example 2 Product (6 Mrad, 0.004% by vol. O$_2$ in N$_2$) | | | | | | | | |
| Sample A[h] | 7.6 | 4.3 | 9.4 | — | — | — | — | 17.2 |
| Sample B | 7.6 | 4.3 | 9.5 | 1.85 | 4.65 | 1,250,000 | 0.32 | 14.8 |

[a]Melt Flow Rate, ASTM 1238-82 Condition L.
[b]Intrinsic Viscosity, J.H. Elliott, et al., (supra).
[c]Zero Shear Viscosity, e.g., K. Walters, "Rheometry", Chapman and Hall, London, 1975.
[d]Weight Average Molecular Weight, M. L. McConnell, (supra).
[e]This M$_w$ was obtained by gel permeation chromatography on a GPC-200 instrument.
[f]Branching Index.
[g]Flow Activation Energy, W. Philippoff, F. H. Gaskins, J. Poly. Sci., 21, 205-222 (1956), $\eta(T)/\eta(T_o) = a_T = K\exp(\Delta E/RT)$.
[h]Sample A was used for extensional viscosity measurements. Sample B was used for all other measurements. These samples were prepared under identical conditions.

Figure 2:
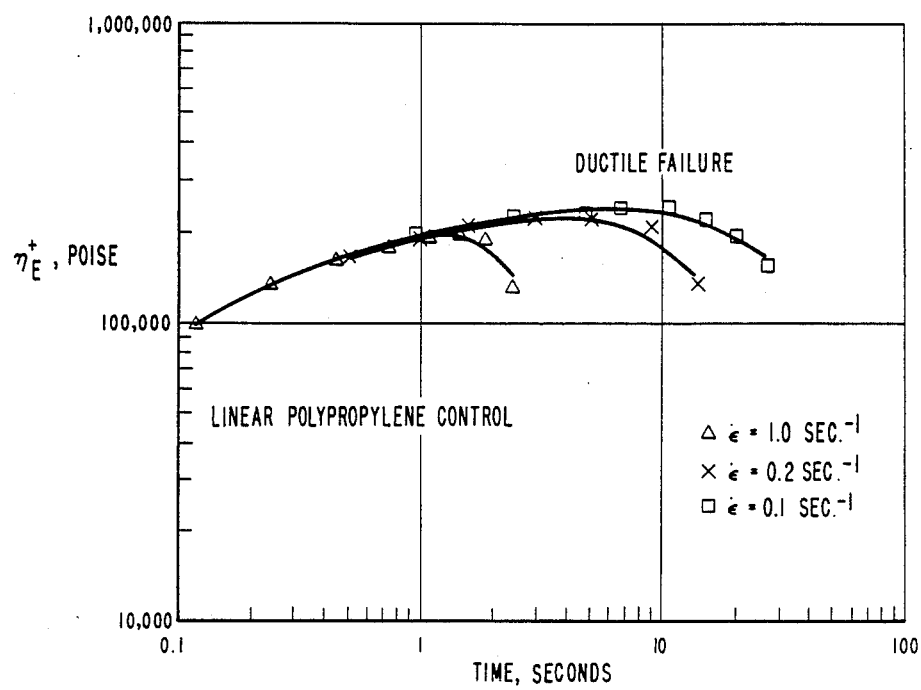
FIGS. 2-4 plots of elongational viscosities versus elongation times of a control sample of a non-irradiated, visbroken, linear polypropylene and of samples of two, free-end long chain branched polypropylene products obtained by the process of this invention.
Figure 3:
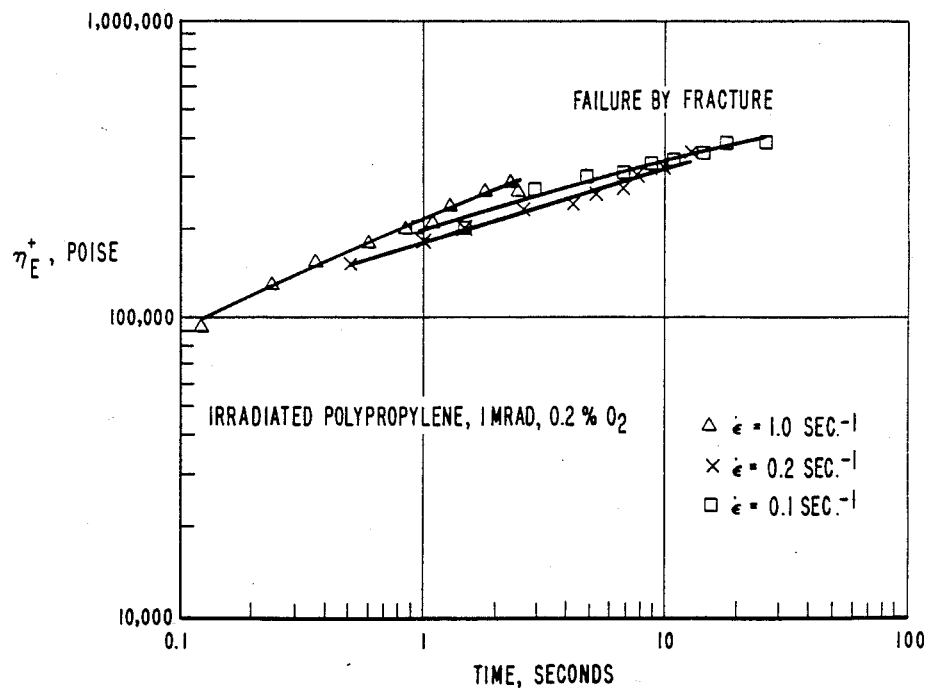
Figure 4:
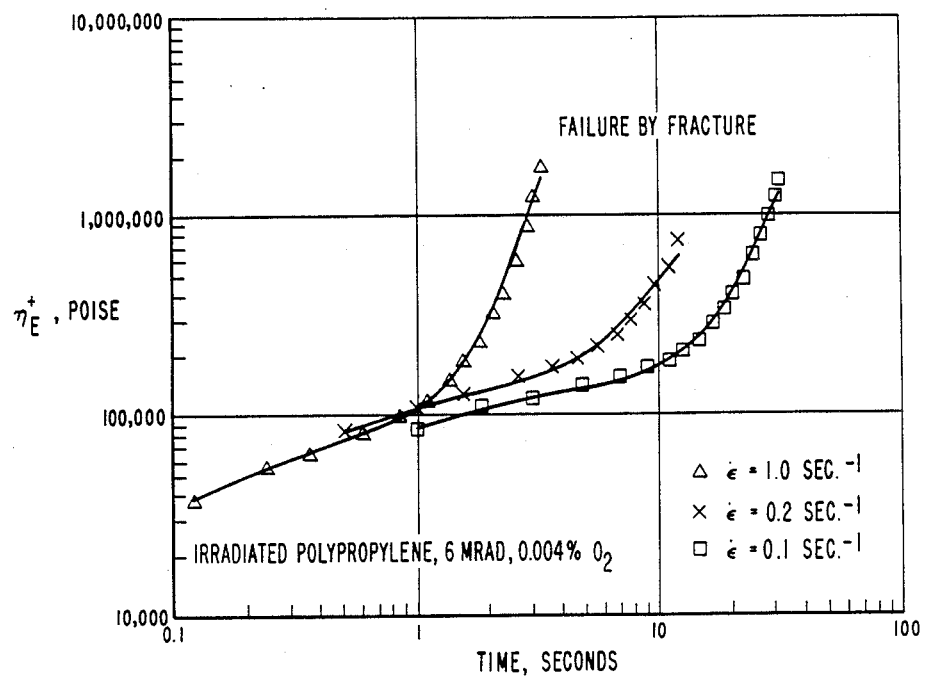
Figure 5:
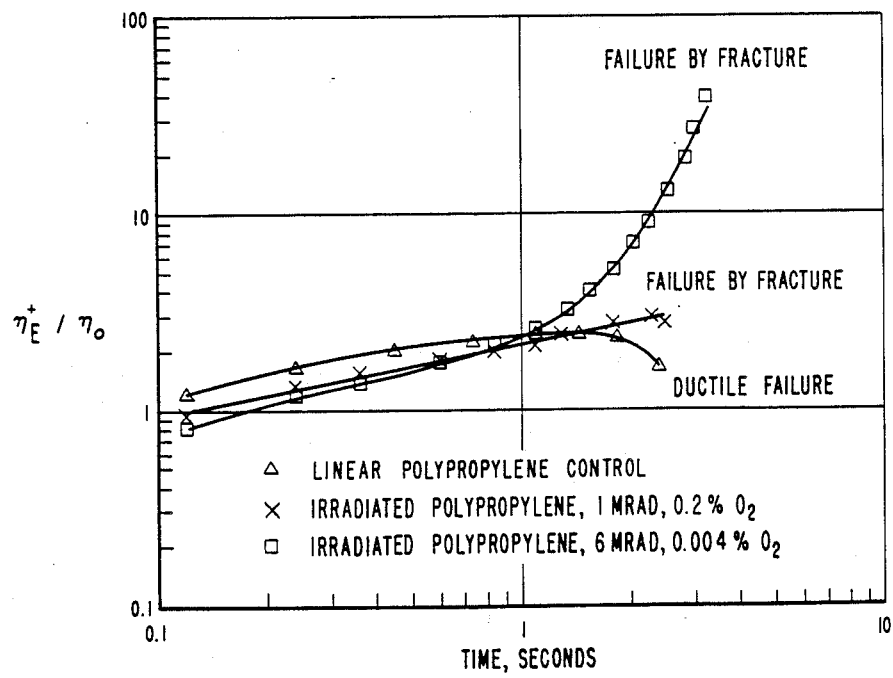
FIG. 5 is a plot of normalized elongational viscosity data versus elongation times at a specific elongation rate with respect to the samples of FIGS. 2-4.

The elongational properties of the three materials are illustrated in FIGS. 2-4, and are compared in FIG. 5.

More particularly, FIGS. 2-4 are plots of elongational viscosity ($\eta_E$, poise) versus time (seconds) at the elongation rates (sec$^{-1}$) indicated. These data were obtained on samples of the control, the Example 1 product and of the Example 2 product with the Rheometrics extensional rheometer (RER-9000) referred to above. In obtaining the data of FIGS. 2-4, the samples were elongated to failure, and the type of failure noted. One type of failure is referred to as ductile failure. This is failure by thinning. The other type of failure is failure by fracture or elastic failure. In this kind of failure, the material behaves as though it were brittle, and breaks.

Thus, it will be observed in FIG. 2 that for the visbroken linear polypropylene control, a linear polypropylene, as the molten material is stretched or elongated, the elongational viscosity generally increases with time, but as the point of failure is approached, it decreases to such point, whereat the failure is ductile in character. On the other hand, as shown in FIGS. 3 and 4 the free-end long chain branched polypropylene samples on stretching exhibit a general increase in the elongational viscosity with time and, as the point of failure is approached, continues to increase somewhat linearly (FIG. 3) in the case of the polypropylene of Example 1 (low amount of free-end long chain branching), and dramatically (FIG. 4) in the case the polypropylene of Example 2 (high amount of free-end long chain branching). Moreover, as FIGS. 3 and 4 indicate, the free-end long chain branched polypropylene of each Example fails by fracture.

The elongational properties of the three materials are compared in FIG. 5 in which the normalized elongational viscosities $\eta_E$ (elongational viscosity) at an elongation rate of 1.0 sec$^{-1}$ divided by $\eta_0$ (zero shear viscosity) at the same test temperature as determined by a Rheometrics mechanical spectrometer as a function of time for each of the materials up to the point of failure are plotted. The resulting curves illustrate dramatically the strain hardening properties of the two embodiments of the free-end long chain branched polypropylene of this invention.

EXAMPLES 3 AND 4

These examples illustrate a melt processing utility of the free-end long chain branched polypropylene of this invention. In particular, they illustrate the use of the non-linear polypropylene in extrusion coating.

In these examples the melt flow rates are determined by the procedure of ASTM 1238-Condition L.

The extrusion coating compositions of these examples have this basic formulation:

| Components | Parts by Weight |
| --- | --- |
| Resin | 100 |
| Phenolic Antioxidant | 0.1 |
| Calcium Stearate | 0.07 |

The composition of the resin component is identified in Table II. In Examples 3 and 4 the free-end long chain branched polypropylene is made as by the process of FIG. 1 from a finely divided, linear polypropylene of commerce, the intrinsic viscosity of which is 4.7, and having a conventional phenolic antioxidant content of about 0.001% by weight. In making the branched polypropylene of these Examples, the electron beam dosage is 8 megarads, the molecular oxygen content of the environment of the system is about 0.1% by volume, and the period of time between irradiation and quench is about 5.5 minutes. The branching index of the resin is typically 0.33. The free-end long chain branched resin typically has a melt flow rate of about 34 dg/min.

The linear polypropylene of Example 4 is a conventional pelletized, linear polypropylene of commerce, the melt flow rate of which is 45 dg/min. It too typically has a conventional phenolic antioxidant at about 0.1% by weight of the polypropylene.

The added antioxidant in each example is a suitable conventional phenolic antioxidant.

The composition of each example is made by blending the components thereof.

To use the compositions of the two examples, they are melt extruded through a sheeting die onto a relatively moving substrate such as, for example, paper, metal, or the like.

Typical results are illustrated by the data set forth in Table II. The results were obtained by extruding the compositions set forth in Table II through a 6.35 cm Davis-Standard extruder with a barrel length to diameter ratio of 26:1 and a screw of the metering type with 5 compression flights and 13 metering flights, into a center fed, key hole type, 40.6 cm wide Egan die. The composition in each case was extruded onto a moving substrate just prior to the substrate entering the nip between a chill roll and a nip roll. The following conditions applied for each composition in Table II:

Barrel Temperatures: 204° C., 260° C., 288° C., 304° C., 304° C.
Adapter Temperature: 321° C.
Die Temperature: 321° C.
Air Gap: 8.9 cm.
Chill Roll Temperature: 16° C.
Nip Pressure: 13 kg/cm$^2$
Substrate: 13.6 kg/ream (500 sheets, 61 cm×91.4 cm) unbleached kraft paper
Linear Speed Range of Takeup System: 30 m/min–305 m/min
Extrusion Rate: 36.3 kg/hr.

TABLE II

| Resin | Example 3 Free-End, Long Chain Branched Polypropylene | Example 4 Example 3 Polypropylene (30% by weight) Linear Polypropylene (70% by weight) | Comparison Conventional Linear Polypropylene |
| --- | --- | --- | --- |
| Melt Flow Rate (dg/min) | 34 | 47 | 35 |
| Max. Coating Speed (m/min.) | 213 | 244 | 107 |
| Neck-In* (cm) | 2.5 | 3.8 | 15.5 |

*Neck-in is the difference between the die width and the final coat width in the substrate.

As can be seen, the maximum coating speed of the linear polypropylene, is quite low, and the neck-in exhibited by this resin is excessive. Also, it was found that at speeds in excess of the maximum coating speed, draw resonance and then failure of the coating composition occurs.

As further can be seen, the extrusion coating performance of the polypropylene of this invention, Example 3, is superior to that of the linear polypropylene. The neck-in of the coating composition of this invention is one-sixth that of the coating composition in which the resin component is linear polypropylene. Also, the maximum coating speed attained by the coating composition of this invention is twice that attained by the control.

The coating composition of Example 4 also exhibits good extrusion coating performance. The neck-in of it is about one-fourth the neck-in of the comparison coating composition, while the maximum coating speed is more than twice that of the comparison coating composition. Blending of the free-end long chain branched polypropylene of this invention with another linear polypropylene of commerce significantly improves the extrusion coating performance of that linear polypropylene.

EXAMPLE 5

This example illustrates the use of the free-end long chain branched polypropylene of this invention in air-quenched tubular blown film.

The composition of this example has this formulation:

|  | Parts by Weight |
|---|---|
| Linear Polypropylene (Melt Flow Rate = 7.0–9.0 dg/min.) | 90 |
| Free-End Long Chain Branched Polypropylene (g' = 0.33) | 10 |
| Antioxidant | 0.1 |

The free-end long chain branched polypropylene is one made according to the process of Example 1 starting with a linear polypropylene of commerce, the I.V. of which is 4.7, and which typically has a conventional phenolic antioxidant at a concentration of about 0.001% by weight. In the process the linear polypropylene is radiated with an electron beam for a total dosage of 8 megarads, the environment from radiation to quenching contains 0.1% by volume of molecular oxygen, and the total time of the radiated material in the environment from radiation to quenching is 5.5 minutes.

The linear polypropylene component of the composition of this example typically has a conventional phenolic antioxidant content of about 0.001% by weight of the polypropylene.

The added antioxidant of the composition is a conventional phenolic antioxidant.

The composition of this example is prepared by blending the components. Typically, the composition, a resin blend, has a final melt flow of 8.6 dg/min.

Typical results achieved in using this composition to make blown film are set forth in the following Table III. These results were actually obtained with a modified Chi Chang water-quenched blown film line comprising a 50 mm extruder with a barrel length to diameter ratio of 26:1, and a 100 mm diameter annular die without the usual water ring, but with a larger capacity blower connected to the air ring. The air ring was a single lip air ring with a 45° lip angle and located 4.25 cm below the die. The gap of the air ring was adjustable, but was set at 9 mm. The tower height was 1.9 meters. The polished nip rolls were driven by a variable speed motor which allowed the linear take-off speed of the film to be adjusted.

The data set forth in Table III also include data obtained with a comparison composition consisting of the same linear polypropylene resin and antioxidant as in the sample of composition of this Example. The melt flow rate of the linear polypropylene was 8 dg/min. (ASTM 1238-Condition L).

TABLE III

|  | Example 5 | Comparison Composition |
|---|---|---|
| Processing Temperature (°C.) | 210 | 200 |
| Q (kg/hr) | 16.8 | 14.4 |
| Drawdown Ratio MD/CD | 7.6/2.7 | 6.7/2.7 |
| Average Thickness (mm) MD/CD | 0.036/0.037 | 0.039/0.042 |
| Coefficient of Variation of % Thickness MD/CD | 2.4/6.0 | 7.6/23.6 |
| Frostline Position (cm) | 22.35 | 31.75 |
| Haze (%) | 17.8 | 58.2 |
| Gloss (%) | 34.8 | 16.9 |

The comparison composition could not be processed on the film line at temperatures above 200° C. Moreover, as can be seen in the table, the film produced from the comparison composition at 200° C. had poorer film uniformity, based on the coefficient of variation of thickness, than film produced from the Example 5 composition. On the other hand, the Example 5 composition processed easily at 210° C. and gave film with improved gauge control. The haze value of the film of the Example 5 composition is much lower than that for the film of the comparison composition. Also, the film gloss in the case of the Example 5 composition is approximately twice that of the film of the comparison composition.

Furthermore, the Example 5 composition formed a bubble with a shorter neck and with the frost line closer to the air ring than the bubble formed by the comparison composition. Moreover, the bubble formed by the Example 5 composition was more stable.

EXAMPLE 6

This example illustrates the use of the free-end long chain branched polypropylene of this invention in thermoforming.

The composition of this example comprises:

|  | Parts by Weight |
|---|---|
| Commerical impact resin | 100.0 |
| Free-end long chain branched polypropylene | 42.8 |
| Antioxidant | 0.2 |
| Calcium stearate | 0.1 |

The commercial impact resin consists of a polymeric product formed by the sequential polymerization of propylene and ethylene, and a conventional phenolic antioxidant at about 0.1% by weight of the resin. It has an ethylene unit content of about 6.0–7.5, and the nominal melt flow rate (ASTM 1238, Condition L) is about 0.4 dg/min.

The free-end long chain branched polypropylene is one prepared as by the process of Example 1 from linear polypropylene, the intrinsic viscosity of which is 4.7, and typically having a conventional phenolic antioxidant content of about 0.1% by weight of the linear polypropylene. The radiation is by an electron beam, the dosage is 6 megarads, the controlled environment contains 0.004% by volume molecular oxygen, and the hold time in the environment between irradiation and quench is about 4.3 minutes. The melt flow rate (ASTM 1238, Condition L) of the free-end long chain branched polypropylene is about 8–10 dg/min, and its branching index g' is 0.3.

The additional antioxidant is a mixture of conventional phenolic antioxidant and a conventional phosphite heat stabilizer.

The composition of the formulation is prepared by blending the components thereof in a Henschel mixer for 2 minutes at high speed, and then for 1 minute at low speed. The blended material is then fed into a single screw compounding extruder. The extruder is set at the following conditions:

| Extruder barrel temperature |  |
|---|---|
| Zone 1 | 204° C. |
| Zones 2–5 | 232° C. |
| Adapter temperature | 221° C. |
| Die temperature | 232° C. |
| Screw speed | 110 rpm |
| Screw diameter | 6.4 cm |
| Length/diameter ratio | 24/1 |
| Screen pack | 60/100/60 |

-continued

|  | U.S. mesh size |

In combination with the extruder is a pelletizing die having 10 holes of 4.8 mm diameter each. The molten "strands" that exit the die are cooled in a water bath and cold cut into small cylindical pellets that are dried and collected.

The blend is subsequently formed into a sheet having a thickness of 0.76 mm and a width of 20.3 mm by extrusion from a single screw extruder with a 25.4 cm sheet die and in combination with a bank of chill rolls. The following sheet formation conditions are used:

| Extruder barrel temperature | |
| --- | --- |
| Zones 1–3 | 232° C. |
| Adapter temperature | 232° C. |
| Die temperature | 232° C. |
| Chill roll temperature | 79.4° C. |
| Die opening | 1.0 mm |
| Screw speed | 50 rpm |
| Screw diameter | 5.1 cm |
| Length/diameter ratio | 24/1 |
| Screen pack | 60/100/60 U.S. mesh size |

The molten web that exits the sheet die is cooled, polished by the chill rolls, and collected.

The sheet thus formed is used in conventional thermoforming operations.

Typical results achieved in such operations are exemplified by the following actual data obtained as follows. The data were obtained with a thermoformer that is a Comet Industries Lab Master equipped with a plug-dish mold for one run and a plug margarine tub mold for another run. Dishes formed in the plug-dish mold were used to measure the thickness of the part at a constant draw-down ratio, and tubs formed in the margarine tub mold were used to measure part thickness at different draw-down ratios. The following thermoforming conditions were used.

| Oven heater temperature | 316° C. |
| --- | --- |
| Vacuum | 660 mm Hg |
| Heating time | varied |
| Drape delay time | 1 second |
| Drape return time | 30 seconds |

A 15.2 cm×15.2 cm×0.76 mm section of sheet was placed in a clamping frame and was transported to an oven equipped with infra-red ceramic heaters. After a specified time, the clamping frame was returned from the oven and the molten sheet captured by the ascending mold. The molten sheet was forced against the contours of the mold by activation of vacuum. The formed part was held in the mold until it had cooled, and then was subsequently removed.

Various heating times were employed and after each cycle, the variation of the thickness of each part was determined. After several cycles had been completed, the data were analyzed and the heating time at which the smallest variation occurred was then determined by further experimentation. The variation at this optimum heating time was recorded as the optimum thickness variation for the composition.

The thickness of the dishes was measured along the side wall in the circumferential direction, and that of the margarine tubs was measured from the flange down to the base.

The sheet's resistance to sag over extended heating times was determined by placing the ends of a 40.6 cm×20.3 cm×0.76 mm section of sheet in the clamping frame, transporting it to the oven, and recording the time required for the sheet to sag a distance of 7.6 cm below the plane of the clamping frame. The results are shown in the following table which includes data obtained with a comparison composition consisting of the same impact resin, antioxidant and calcium stearate at the same parts by weight as in the formulation of the Example 6 composition.

TABLE IV

| Composition | Optimum Thickness Variation (%) | | 7.6 cm Sag Time (seconds) |
| --- | --- | --- | --- |
|  | Dish | Margarine Tub |  |
| Example 6 | 24 | 57 | 120 |
| Comparison Composition | 31 | 60 | 72 |

The data show that the free-end long chain branched polypropylene of this invention is effective in improving the thermoforming properties of commercial impact resin.

Hence, the free-end long chain branched propylene polymer material of this invention has utility in melt processing operations to form useful articles. Indeed, the strain hardening propylene polymer material of this invention is useful in all melt processing operations in which a high molecular weight, propylene polymer material of enhanced melt strength is desired.

Other features, advantages and embodiments of the invention disclosed herein will be readily apparent to those exercising ordinary skill after reading the foregoing disclosures. In this regard, while specific embodiments of the invention had been described in considerable detail, variations and modifications of these embodiments can be effected without departing from the spirit and scope of the invention as described and claimed.

The expression "consisting essentially of" as used in this specification excludes an unrecited substance at a concentration sufficient to substantially adversely affect the essential properties and characteristics of the composition of the matter being defined, while permitting the presence of one or more unrecited substances at concentrations insufficient to substantially adversely affect said essential properties and characteristics.

We claim:

1. Normally solid, high molecular weight, gel-free, propylene polymer material, the branching index of which is less than 1, that has strain hardening elongational viscosity.

2. Normally solid, high molecular weight, gel-free, predominantly isotactic, semi-crystalline propylene polymer material, the branching index of which is less than 1, that has strain hardening elongational viscosity.

3. Propylene polymer material according to claim 2, which consists essentially of high molecular weight polypropylene, the branching index which is less than about 0.9.

4. Propylene polymer material according to claim 3 in which the branching index is about 0.2–0.4.

5. An extrusion coating composition consisting essentially of normally solid, high molecular weight, gel-free, amorphous to predominantly crystalline propylene polymer material, the branching index of which is less than 1, which material has strain hardening elongational viscosity.

6. A film forming composition consisting essentially of normally solid, high molecular weight, gel-free, amorphous to predominantly crystalline propylene polymer material, the branching index of which is less than 1, which material has strain hardening elongational viscosity.

7. Film consisting essentially of normally solid, high molecular weight, gel-free, amorphous to predominantly crystalline propylene polymer material, the branching index of which is less than 1, which material has strain hardening elongational viscosity.

8. A propylene polymer composition useful for melt processing, which comprises normally solid, high molecular weight, gel-free, amorphous to predominantly crystalline propylene polymer material, the branching index of which is less than 1, which material has strain hardening elongational viscosity.

9. A useful article composed of a propylene polymer composition comprising a substantial quantity of normally solid, high molecular weight, gel-free, amorphous to predominantly crystalline propylene polymer material, the branching index of which is less than 1, which material has strain hardening elongational viscosity.

* * * * *